(12) United States Patent
Miyabara et al.

(10) Patent No.: US 9,634,534 B2
(45) Date of Patent: Apr. 25, 2017

(54) BRUSHLESS MOTOR

(71) Applicant: SANYO DENKI CO., LTD., Tokyo (JP)

(72) Inventors: Yoshinori Miyabara, Tokyo (JP); Haruhisa Maruyama, Tokyo (JP); Kei Satou, Tokyo (JP); Haruka Sakai, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 160 days.

(21) Appl. No.: 13/919,133

(22) Filed: Jun. 17, 2013

(65) Prior Publication Data

US 2013/0334917 A1 Dec. 19, 2013

(30) Foreign Application Priority Data

Jun. 18, 2012 (JP) ................................. 2012-137202

(51) Int. Cl.
  *H02K 3/50* (2006.01)
  *H02K 9/06* (2006.01)
  *H02K 3/52* (2006.01)
  *H02K 7/14* (2006.01)
  *H02K 11/33* (2016.01)

(52) U.S. Cl.
  CPC ............... *H02K 3/50* (2013.01); *H02K 3/522* (2013.01); *H02K 7/14* (2013.01); *H02K 11/33* (2016.01); *H02K 2203/03* (2013.01); *H02K 2213/12* (2013.01)

(58) Field of Classification Search
  CPC .......... H02K 5/225; H02K 5/522; H02K 3/50; H02K 11/33; H02K 7/14; H02K 2203/03; H02K 2213/12

USPC ............................ 310/71, 67 R, 68 R, 62, 63
See application file for complete search history.

(56) References Cited

U.S. PATENT DOCUMENTS

| 5,548,458 | A | | 8/1996 | Pelstring et al. |
| 5,770,902 | A | * | 6/1998 | Batten .................... H02K 5/225 |
| | | | | 310/68 D |
| 5,815,345 | A | | 9/1998 | Pelstring et al. |
| 5,990,589 | A | * | 11/1999 | Ushikoshi .............. H02K 3/522 |
| | | | | 310/194 |

(Continued)

FOREIGN PATENT DOCUMENTS

| CN | 101213723 A | 7/2008 |
| CN | 101751953 A | 6/2010 |

(Continued)

OTHER PUBLICATIONS

Machine translation of JP 2001-169496.*

(Continued)

*Primary Examiner* — Michael Andrews
*Assistant Examiner* — Ahmed Elnakib
(74) *Attorney, Agent, or Firm* — Polsinelli PC

(57) ABSTRACT

A brushless motor includes a stator as an armature where a plurality of coils is housed and a rotor as a magnetic exciter having a permanent magnet, wherein an end portion of the coil housed in a slot of a stator stack is inserted into a wire binding board having a wire binding pattern of the coil, the end portion of the coil is soldered to a land of the wire binding board, and the wire binding board and a circuit board are electrically conducted to each other through an connecting terminal.

3 Claims, 3 Drawing Sheets

(56) References Cited

U.S. PATENT DOCUMENTS

| | | | |
|---|---|---|---|
| 6,356,005 B1* | 3/2002 | Hsu | H02K 1/146 310/254.1 |
| 6,380,648 B1* | 4/2002 | Hsu | 310/67 A |
| 6,483,213 B1* | 11/2002 | Hsu | H02K 3/522 310/68 R |
| 2002/0093259 A1* | 7/2002 | Sunaga | H02K 11/0005 310/68 R |
| 2003/0160537 A1* | 8/2003 | Hsu | H02K 11/33 310/254.1 |
| 2003/0222532 A1* | 12/2003 | Hsu | F16H 57/033 310/75 R |
| 2008/0054735 A1 | 3/2008 | Yoshida et al. | |
| 2008/0079325 A1* | 4/2008 | Yamada | H02K 3/522 310/67 R |
| 2008/0315695 A1* | 12/2008 | Yamada | H02K 3/522 310/71 |
| 2009/0134724 A1* | 5/2009 | Ishizeki | H02K 3/522 310/71 |
| 2010/0109458 A1* | 5/2010 | Hauser et al. | 310/71 |
| 2010/0129242 A1 | 5/2010 | Yamada et al. | |
| 2010/0148639 A1* | 6/2010 | Lee | G11B 19/2009 310/68 D |
| 2011/0081258 A1 | 4/2011 | Yoshida et al. | |

FOREIGN PATENT DOCUMENTS

| | | | |
|---|---|---|---|
| JP | 2001-169496 | * 6/2001 | H02K 3/522 |
| JP | 2001327110 A | 11/2001 | |
| JP | 2001224351 A | 2/2003 | |
| JP | 2009247138 A | 10/2009 | |
| JP | 20110151875 A | 8/2011 | |

OTHER PUBLICATIONS

English translation of JP 2001-169496; Jun. 2001; Endo et al.; Japan.*

English machine translation of Endo et al.;JP 2001-0169496; Jun. 2001;Japan.*

Official Notice of Reason for Refusal for Japanese Patent Application No. 2012-137202.

Extended European Search Report issued on Jan. 29, 2016 for the corresponding European Patent Application No. 13170791.1.

Office Action dated Jun. 20, 2016 from corresponding Chinese Patent Application No. 201310236622.X, pp. 1-5.

* cited by examiner

BRUSHLESS MOTOR

CROSS-REFERENCE TO RELATED APPLICATION

This application claims priority to Japanese Application No. 2012-137202, filed Jun. 18, 2012, the entirety of which is incorporated herein by reference.

BACKGROUND

1. Technical Field

The present invention relates to a brushless motor having an improved coil wire binding structure inside a slot of a stator stack.

2. Description of Related Arts

A brushless motor includes an armature where a plurality of coils is wound and a magnetic exciter having a permanent magnet. Typically, an outer rotor type brushless motor is employed in an axial flow fan such as a cooling fan. In the outer rotor type brushless motor, an armature having a coil is provided as an inner stator, and a magnetic exciter having a permanent magnet is provided as an outer rotor in an outer circumference of the stator.

The coil is housed in a plurality of slots formed in the stator stack. For example, in the case of a stator stack having twelve slots, it is necessary to route twenty four connecting wires on a three-phase basis (u-phase, v-phase, and w-phase). Therefore, a wire binding work for the connecting wire of the coil becomes cumbersome and increases a manufacturing cost.

In this regard, it is desirable to develop a technology capable of simplifying and optimizing a coil wire binding work. As a related art for a simple and efficient coil wire binding work, a technique is disclosed, in which each end portion of a plurality of stator coils is commonly connected to an electric conductor provided in an insulation cover of the stator core, so that the electric conductor is used as a connecting wire and a print pattern (for example, refer to JP 2001-327110 A).

In the technique disclosed in JP 2001-327110 A, the coil wire binding work is simplified and optimized by using the electric conductor provided in the insulation cover of the stator core as a connecting wire and a print pattern.

However, in the technique disclosed in JP 2001-327110 A, it is difficult to change a wire binding pattern of the coil without changing a coil structure or a wiring structure of the connecting wire to the electric conductor. For example, in the brushless motor having twelve slots, twenty four connecting wires are routed on a three-phase basis (u-phase, v-phase, and w-phase). However, performance of the motor rotation changes depending on a wiring pattern of the connecting wire.

Therefore, in the technique disclosed in JP 2001-327110 A, it is necessary to change the coil structure or the wiring structure to the electric conductor whenever a design of the wiring pattern of the coil changes. This further causes cumbersomeness of the coil wire binding work.

SUMMARY

In view of the aforementioned problems, the present invention provides a brushless motor capable of reducing a wire binding process time and a manufacturing cost by simplifying and optimizing the coil wire binding work.

In addition, the present invention provides a brushless motor capable of changing the wire binding pattern of the coil in a simple manner just by changing the wire binding board without changing the coil structure and handling of the connecting wire.

According to an aspect of the invention, there is provided a brushless motor comprising a stator as an armature where a plurality of coils is wound and a rotor as a magnetic exciter having a permanent magnet.

An end portion of the coil housed in a slot of a stator stack is inserted into a wire binding board having a wire binding pattern of the coil, the end portion of the coil is soldered to a land of the wire binding board, and the wire binding board and the circuit board are electrically conducted to each other through a connecting terminal.

According to the present invention, the end portion of the coil and the circuit board are electrically connected to each other through the connecting terminal and the wire binding board having the wire binding pattern of the coil.

In the brushless motor according to the present invention, it is not necessary to individually bind a plurality of connecting wires of the coils. Therefore, it is possible to simplify and optimize a coil wire binding work and reduce a wire binding process time and a manufacturing cost.

In the brushless motor according to the present invention, it is possible to change the wire binding pattern of the coil in a simple manner just by changing the wire binding board without changing the coil structure and handing of the connecting wire of the coil.

DETAILED DESCRIPTION

Hereinafter, a brushless motor according to the present embodiment will be described with reference to the accompanying drawings.

In the brushless motor according to the present embodiment, an end portion of a coil and a circuit board are electrically connected to each other through a connecting terminal and a wire binding board having a wire binding pattern of the coil. According to the present embodiment, it is possible to provide a brushless motor capable of changing the wire binding pattern of the coil in a simple manner just by changing a wire binding board without changing a coil structure and handling of the connecting wire of the coil.

[Configuration of Brushless Motor]

Figure 1:
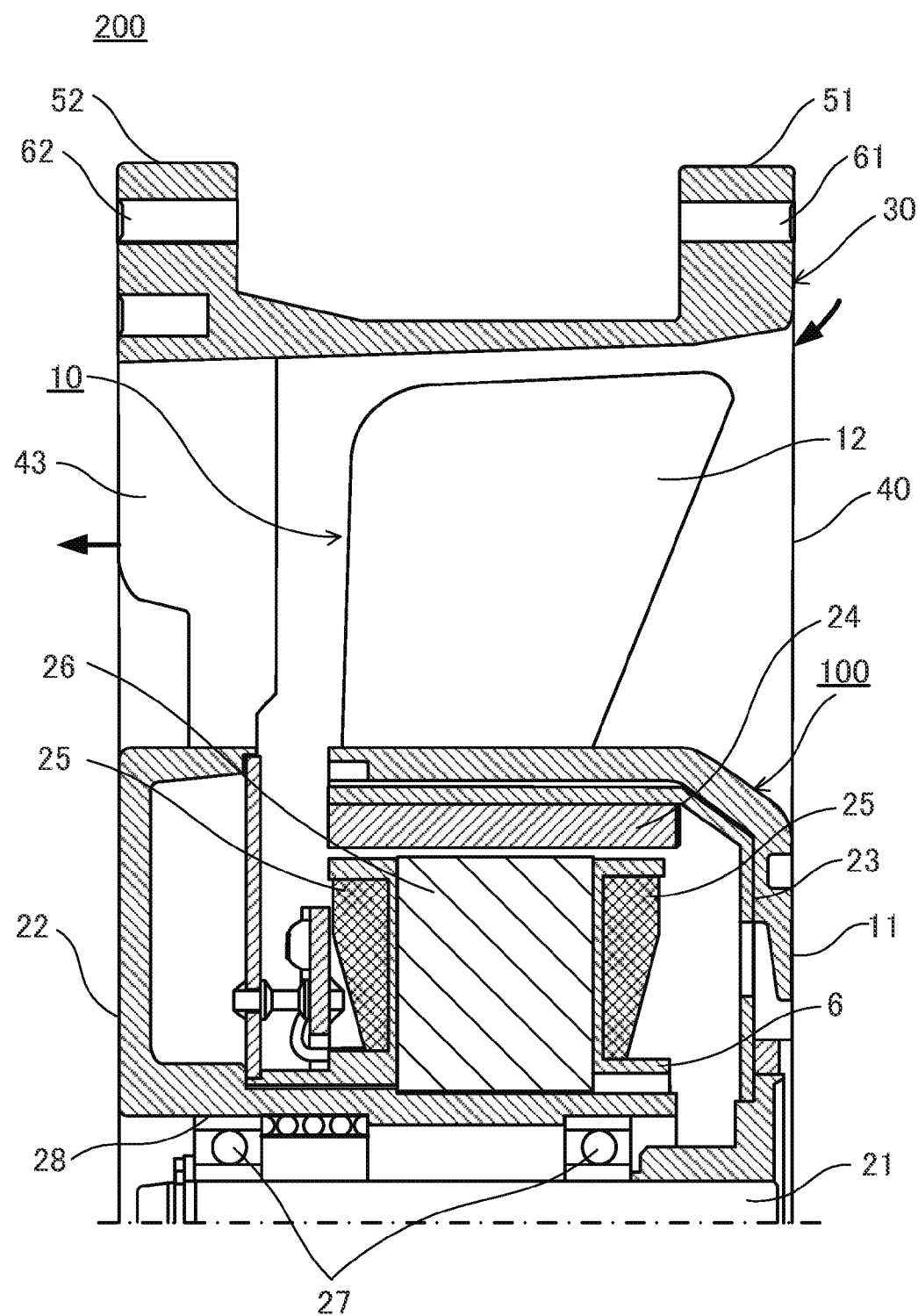
FIG. 1 is a cross-sectional view illustrating an axial flow fan obtained by applying a brushless motor according to the present embodiment.
Figure 2:
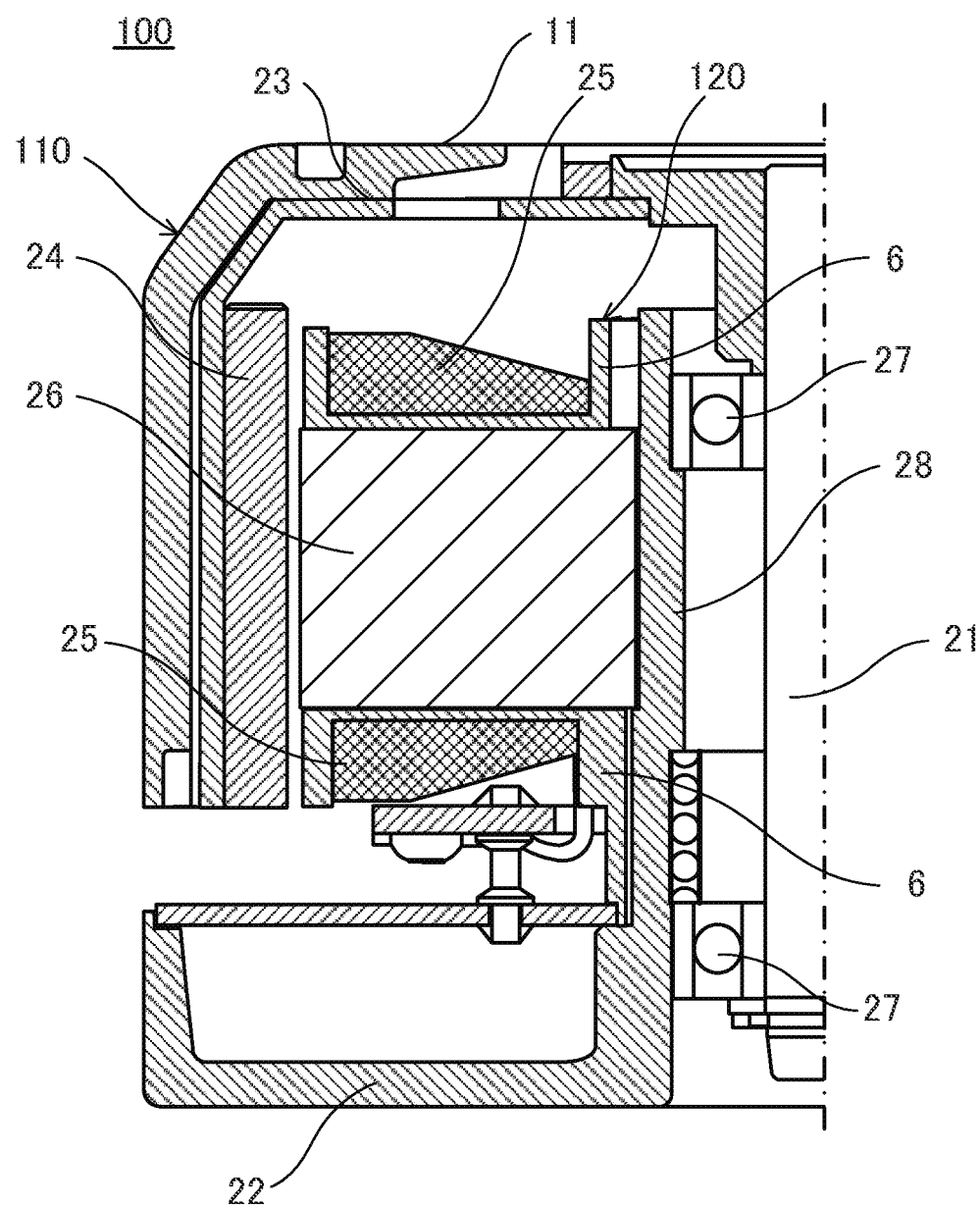
FIG. 2 is a cross-sectional view illustrating the brushless motor according to the present embodiment.

First, an axial flow fan obtained by applying the brushless motor according to the present embodiment will be described with reference to FIGS. 1 and 2. FIG. 1 is a cross-sectional view illustrating an axial flow fan obtained by applying the brushless motor according to the present embodiment. FIG. 2 is a cross-sectional view illustrating the brushless motor according to the present embodiment.

As illustrated in FIG. 1, the axial flow fan 200 is an air blower that receives a fluid from one side of the rotational shaft 21 in an axial direction and discharges the fluid to the other side in the axial direction by virtue of rotation of an impeller 10 installed in a rotational shaft 21 of the brushless motor (hereinafter, simply referred to as a "motor") 100. The axial flow fan 200 has a simple structure, so that a static pressure is weak, but an air volume is large. For example, the axial flow fan 200 is widely employed in various fields such as a ventilation fan or a cooling fan of a personal computer (PC).

The axial flow fan 200 includes an impeller 10 installed in the rotational shaft 21 of the motor 100 and a venturi casing (hereinafter, simply referred to as a "casing") 30 that surrounds an outer circumference of the impeller 10 in a radial direction. In addition, the axial flow fan 200 has a frame 40 that supports a base portion 22 of the motor 100 and integrally supports the casing 30.

The impeller 10 has a cup-like hub portion 11 in the center. Around the hub portion 11, a plurality of blades is integrally installed in a radial shape. Each blade 12 is inclined with respect to the axial direction of the rotational shaft 21.

As illustrated in FIGS. 1 and 2, inside the hub portion 11, the motor 100 is provided as a rotational driving unit for the impeller 10. The motor 100 includes a stator 120 as an armature where a plurality of coils 25 is wound and a rotor as a magnetic exciter having a permanent magnet 24. The rotor 110 includes a rotor yoke 23 having an approximately cup-like shape, a rotational shaft 21 pressedly inserted into the center of the rotor yoke 23, a permanent magnet 24, and the like. The stator 120 includes a stator stack 26, a coil 25 housed in a slot (not illustrated) of the stator stack 26, and the like.

The rotor yoke 23 is inserted into the hub portion 11. The permanent magnet 24 is fixed to the inner circumferential surface of the rotor yoke 23. The rotor yoke 23 closes a magnetic flux from a magnetic exciter and maximizes an electromagnetic induction effect of the permanent magnet 24. In addition, the rotor yoke 23 prevents peripherals of the motor 100 from being influenced by a magnetic field caused by electromagnetic induction.

A material of the rotor yoke 23 may include, for example, but not limited to, an iron-based magnetic material such as a SC (carbon steel) material.

The rotational shaft 21 is rotatably supported by the bearing 27. The bearing 27 is fixed to an inner surface of a cylindrical bearing support 28. The bearing support 28 is formed in the center of the base portion 22.

The stator stack 26 is fixed to an outer surface of the bearing support 28. The stator stack 26 and the permanent magnet 24 of the rotor yoke 23 face each other by interposing a gap.

The stator stack 26 is formed by stacking a plurality of thin ring-like metal plates in a thickness direction. Preferably, a material of the metal plate of the stator stack 26 includes, for example, a silicon steel sheet to reconcile performance and cost. Each metal plate of the stator stack 26 is stacked by coating an insulation material such as varnish.

Teeth (not illustrated) are protrudingly provided in the inner circumference side of the stator stack 26. Slots as a concave portion for housing the coil 25 are dividingly formed between the teeth. The slots are provided at an equal interval along a circumferential direction of the stator stack 26.

The surrounding of the coil 25 is enclosed with an insulation material 6. As the insulation material 6, for example, a synthetic resin is employed.

Figure 3:
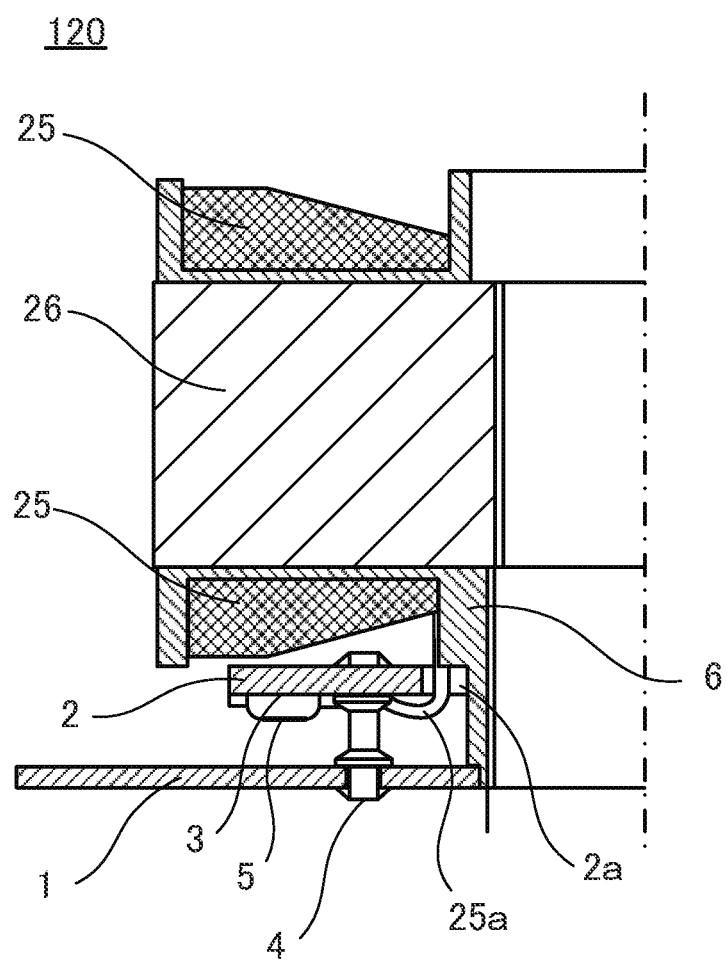
FIG. 3 is a cross-sectional view illustrating main parts of a stator in the brushless motor according to the present embodiment.

Next, a wire binding structure of the coil 25 in the brushless motor 100 according to the present embodiment will be described with reference to FIG. 3. The brushless motor 100 according to the present embodiment is characterized in the wire binding structure of the coil 25. FIG. 3 is a cross-sectional view illustrating main parts of the stator in the brushless motor according to the present embodiment.

As illustrated in FIG. 3, the circuit board 1 is supported on the base portion 22. A wiring pattern for controlling the axial flow fan 200 (refer to FIG. 1) is formed in a circuit board 1.

A wire binding board 2 is provided between a base portion side of the coil 25 wound around the stator stack 26 and the circuit board 1. The wire binding pattern of the coil 25 is formed in the wire binding board 2. For example, in the case of a motor having twelve slots, it is necessary to route twenty four connecting wires on a three-phase basis (u-phase, v-phase, and w-phase). However, the wire binding board 2 has a wire binding pattern for routing the connecting wires on a three-phase basis.

The inner circumference of the wire binding board 2 is supported by the insulation material 6. The insulation material 6 that supports the wire binding board 2 is formed by extending the insulation material 6 used to surroundingly enclose the coil 25.

The inner or outer circumference of the wire binding board 2 is provided with a trench 2a. According to the present embodiment, the trench 2a is formed in the inner circumference of the wire binding board 2.

An end portion 25a of the coil 25 housed in the slot of the stator stack 26 is inserted into the trench 2a of the wire binding board 2. The end portion 25a of the coil 25 inserted into the trench 2a of the wire binding board 2 is soldered to a land 3 formed in aback side of the wire binding board 2.

While the trench 2a is formed in the inner or outer circumference of the wire binding board 2, the invention is not limited thereto. The portion for inserting the end portion 25a of the coil 25 may be a through-hole penetrating the wire binding board 2. However, the trench 2a is advantageous in that the end portion of the coil 25 can be easily handled, compared to the through-hole.

The wire binding board 2 having the land 3 where the end portion 25a of the coil 25 is soldered is electrically connected to the circuit board 1 through the connecting terminal 4. That is, the coil 25 is electrically conducted to the wiring pattern of the circuit board 1 through the wire binding board 2 and the connecting terminal 4.

Referring to FIG. 1, the frame 40 is made of, for example, aluminum, aluminum alloy, and the like. The motor 100 is installed in the base portion of the inlet side of the frame 40. The frame 40 is formed integrally with the cylindrical casing 30 and internally houses the impeller 10. The base portion 22 and the casing 30 are connected to a radial spoke 43.

In addition, the inlet-side and outlet-side fringes of the casing 30 are provided with flange portions 51 and 52, respectively, for fixing the frame 40 to an electronic apparatus and the like. Each of the flange portions 51 and 52 is provided to extend from the inlet and outlet sides of each casing 30 to the outside of the impeller 10 in a radial direction. The flange portions 51 and 52 area square mounting member contiguous to the outer circumferential wall of the casing 30. Screw holes 61 and 62 for fastening the mounting screw are formed in four corners of each flange 51 and 52.

[Effects of Brushless Motor]

Next, effects of the brushless motor 100 according to the present embodiment will be described with reference to FIGS. 1 to 3.

The axial flow fan 200 having the brushless motor 100 according to the present embodiment is installed in a casing of an electronic apparatus and the like by fastening a mounting screw (not illustrated) to the screw hole 61 of the inlet-side flange portion 51 or the screw hole 62 of the outlet-side flange portion 52 through the casing.

For example, in a case where the axial flow fan 200 is used as a cooling fan for a personal computer (PC), the inlet-side flange portion 51 is mounted on a fan mounting seat inside the casing of the PC. In addition, in a case where the axial flow fan 200 according to the present embodiment is used as a ventilation fan, the outlet-side flange portion 52 is mounted on a fringe of an opening on an inner wall of a building.

According to the present embodiment, in a case where ventilation control of the axial flow fan 200 changes, the circuit board 1 having a wiring pattern for control also changes. Meanwhile, in a case where rotational performance of the motor 100 itself changes, the wire binding board 2 having the wire binding pattern of the coil 25 changes.

In the related art, in a case where rotational performance of the motor 100 itself changes, it is difficult to change the wire binding pattern of the coil without changing the coil structure or the wiring structure of the connecting wire to a conductor.

However, the brushless motor according to the present embodiment electrically connects the circuit board 1 and the end portion of the coil 25 using the connecting terminal 4 and the wire binding board 2 having the wire binding pattern of the coil 25. Therefore, in the brushless motor 100 according to the present embodiment, it is possible to change the wire binding pattern of the coil 25 in a simple manner just by changing the wire binding board 2 without changing the coil structure and handling of the connecting wire of the coil 25.

That is, in the brushless motor 100 according to the present embodiment, the end portion 25a of the coil 25 is soldered to the land 3 of the wire binding board 2 (refer to reference numeral 5 in FIG. 3), and the wire binding board 2 and the circuit board 1 are electrically conducted to each other through the connecting terminal 4. Therefore, it is not necessary to individually bind a plurality of connecting wires of the coils 25.

In the brushless motor 100 according to the present embodiment, it is possible to simplify and optimize a wire binding work of the coil 25 and reduce a wire binding process time and a manufacturing cost.

While preferable embodiments of the present invention have been described hereinbefore, they are just for descriptive purposes and are not intended to limit the scope of the invention. Those skilled in the art would appreciate that various changes, modifications, or alterations may be possible without departing from the spirit and scope of the invention.

While an outer rotor type brushless motor has been described in the aforementioned embodiments, the invention may also be applied to an inner rotor type brushless motor without limitation. In the inner rotor type brushless motor, the armature having the coil is used as an outer stator, and the magnetic exciter having the permanent magnet is provided as an inner rotor inside the stator.

What is claimed is:

1. A brushless motor, comprising:
a stator as an armature where a plurality of coils is wound and a rotor as a magnetic exciter having a permanent magnet,
wherein the brushless motor includes an impeller installed in a rotational shaft of the brushless motor, a casing surrounding an outer circumference of the impeller in a radial direction, a frame integrally supporting the casing, and a base portion supported by the frame,
an end portion of the coil housed in a slot of a stator stack is inserted into a wire binding board having a specific wire binding pattern of the coil,
the end portion of the coil is soldered to a land of the wire binding board defining the specific wire binding pattern of the coil, and
the wire binding board and a circuit board including a wiring pattern formed therein for controlling the brushless motor are electrically conducted to each other through a connecting terminal,
the wire binding board having an inner circumference supported by an insulation material,
the insulation material is formed by extending an insulation material that surroundingly encloses the coil, and
the circuit board is supported on the base portion;
the wiring binding board and the circuit board being distinct boards, offset from each other in an axial direction of the motor and at least partially overlapping in the axial direction;
the connecting terminal extending in the axial direction of the motor, ends of the connecting terminal connecting to the wiring binding board and the circuit board to define a physical and electrical connection between the wiring binding board and the circuit board; and
the wiring binding board and the circuit board being opposed to each other with only the connecting terminal interposed between the wiring binding board and the circuit board.

2. The brushless motor according to claim 1, wherein the end portion of the coil is inserted into a trench formed in an inner or outer circumference of the wire binding board.

3. The brushless motor according to claim 1, further comprising:
the wire binding board is a first wire binding board and the specific wire binding pattern of the coil is a first specific wire binding pattern of the coil;
a second wire binding board defining a second specific wire binding pattern of the coil, the second pattern being different than the first pattern; and
wherein the first and second wire binding board can be exchanged to provide different specific wiring patterns to the motor.

* * * * *